July 12, 1927.
W. P. SHUFFLETON
1,635,389
WHEEL ATTACHING DEVICE
Filed June 4, 1925
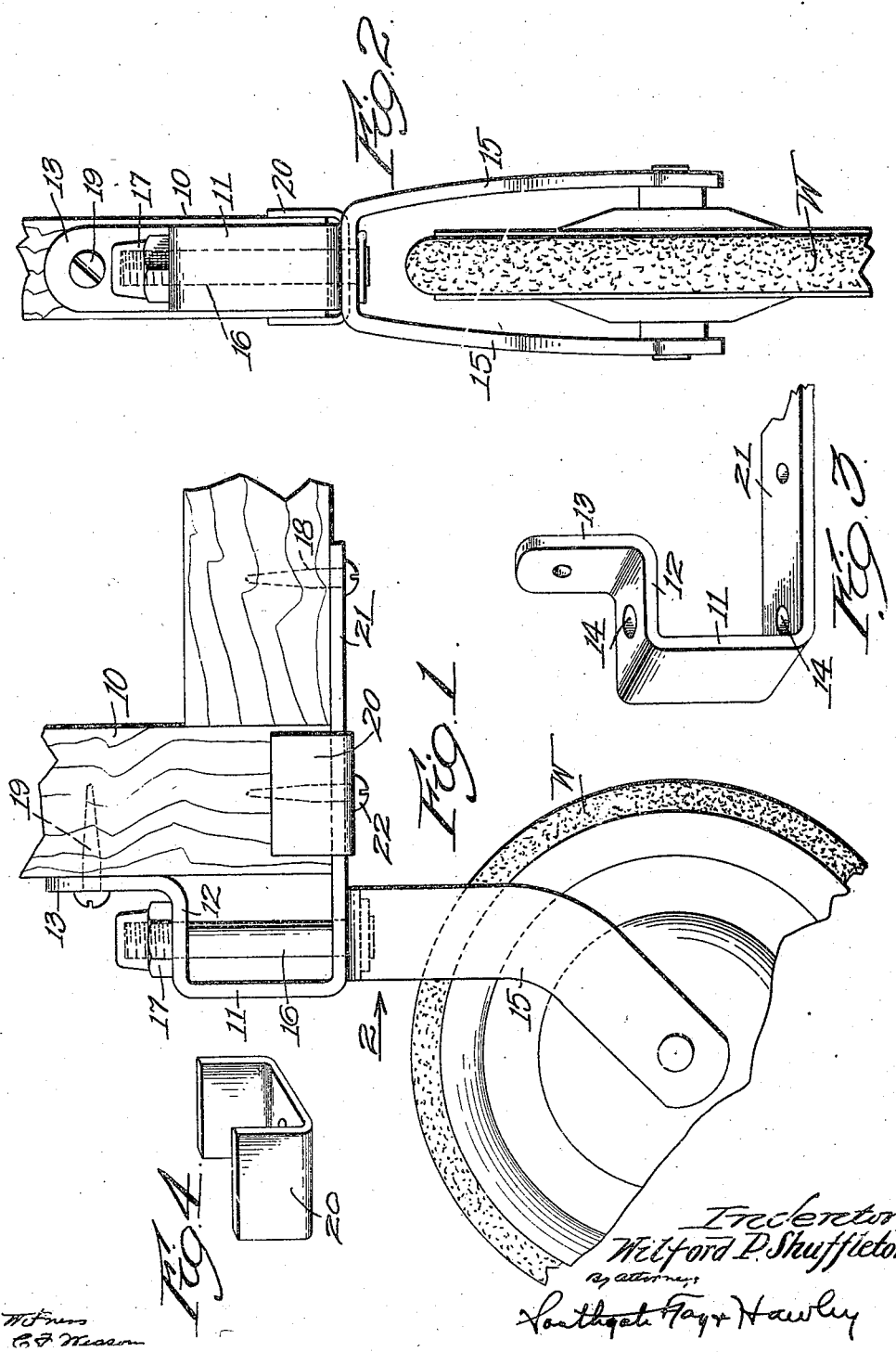

Patented July 12, 1927.

1,635,389

UNITED STATES PATENT OFFICE.

WILFORD P. SHUFFLETON, OF GARDNER, MASSACHUSETTS, ASSIGNOR TO GEM CRIB & CRADLE COMPANY, OF GARDNER, MASSACHUSETTS, A CORPORATION OF MASSACHUSETTS.

WHEEL-ATTACHING DEVICE.

Application filed June 4, 1925. Serial No. 34,963.

This invention relates to a device for attaching a wheel to a crib, bassinet, tea wagon, or other similar article.

It is the object of my invention to provide such an attachment which may be cheaply and easily manufactured, which may be conveniently attached to the article on which it is to be used, and which is effective and reliable in use.

With this general object in view, my invention relates to certain arrangements and combinations of parts which will be hereinafter described and more particularly pointed out in the appended claims.

A preferred form of the invention is shown in the drawings, in which

Fig. 1 is a side elevation of my improved attaching device;

Fig. 2 is an end elevation thereof;

Fig. 3 is a partial perspective view of the main or bearing member of the device; and Fig. 4 is a perspective view of the attaching clip.

Referring to the drawings, I have shown a portion 10 of a frame which may constitute a part of a crib, cradle, bassinet, tea wagon, or any other desired article. My improved attaching device comprises a bearing member 11 which is substantially U-shaped with one leg 12 thereof bent outward substantially at a right angle, as indicated at 13. Bearing openings 14 are formed in the two legs of the member 11 adjacent the closed end of said member.

A wheel W is mounted in a frame or fork 15 having a stud or pintle 16 extending through the bearing openings 14 and preferably retained in position by a nut 17. Screws or other fastening devices 18 and 19 extend through openings in the ends of the two legs of the bearing member and firmly hold said member to the frame 10.

The bearing member is additionally secured in position by a U-shaped clip 20 which embraces the lower or straight leg 21 of the bearing member and also embraces the sides of the frame 10. A screw 22 extends through the clip 20 and through the lower leg 21 of the bearing member and firmly retains the parts in position on the frame 10. This clip 20 engages the portion 10 of the frame with a tight frictional clip which is sufficient in most instances to give the additional security. Obviously if desired a bolt or pin could be passed through either upstanding wing of the clip to still further secure the clip and the straight leg 21 of the bearing member.

Having thus described my invention, it will be seen that I have provided an extremely simple construction for a wheel attaching device, the structure comprising two elements only, each of which may be very easily and cheaply constructed from sheet metal by pressing and punching operations. Although thus cheaply and easily constructed, the device is extremely firm and rigid when attached to a frame and affords an effective and satisfactory bearing for the wheel frame stud or pintle.

Having thus described my invention and the advantages thereof, I do not wish to be limited to the details herein disclosed otherwise than as set forth in the claims, but what I claim is:—

1. A wheel attaching device comprising a substantially U-shaped bearing member having one straight leg and having the end portion of the other leg bent outwardly, substantially at a right angle and having bearing openings in the two legs of said bearing member adjacent the closed end thereof, fastening elements extending through openings in the ends of said legs into supporting surfaces perpendicular to each other to secure said devices in position, and a U-shaped clip extending crosswise of the lower leg of said bearing member and frictionally engaging the frame to which it is attached and embracing said member.

2. A wheel attaching device for bassinets, comprising a substantially U-shaped bearing member having the end portion of one leg bent outwardly substantially at a right angle and having bearing openings in the two legs of said bearing member adjacent the closed end thereof, fastening elements extending through openings in the ends of said legs into supporting surfaces perpendicular to each other to secure said device in position, a U-shaped clip extending crosswise of the lower leg of said bearing member and embracing said member, said clip being designed to frictionally engage the frame to which it is attached, and having an additional fastening element extending therethrough and through said bearing member to secure said parts in assembled relation on said frame.

In testimony whereof I have hereunto affixed my signature.

WILFORD P. SHUFFLETON.